(12) United States Patent
Crowne

(10) Patent No.: US 12,339,153 B2
(45) Date of Patent: Jun. 24, 2025

(54) OPTICAL FABRY-PEROT BASED LIQUID LEVEL SENSORS

(71) Applicant: Simmonds Precision Products, Inc., Vergennes, VT (US)

(72) Inventor: David H. Crowne, Weybridge, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 138 days.

(21) Appl. No.: 17/668,003

(22) Filed: Feb. 9, 2022

(65) Prior Publication Data
US 2023/0251122 A1    Aug. 10, 2023

(51) Int. Cl.
*G01F 23/292*    (2006.01)
*G01F 23/80*    (2022.01)

(52) U.S. Cl.
CPC .......... *G01F 23/292* (2013.01); *G01F 23/804* (2022.01)

(58) Field of Classification Search
CPC ... G01F 23/292; G01F 23/804; G01F 23/2921
USPC .............................. 73/800; 250/227; 356/246
See application file for complete search history.

(56) References Cited

U.S. PATENT DOCUMENTS

| | | | | |
|---|---|---|---|---|
| 4,678,904 A * | 7/1987 | Saaski | ................ | G01N 21/7746 250/227.27 |
| 4,699,511 A * | 10/1987 | Seaver | ................ | G01N 21/431 356/135 |
| 4,778,987 A * | 10/1988 | Saaski | ................ | G01N 21/45 374/E11.018 |
| 4,839,515 A * | 6/1989 | Kershaw | ............... | G02B 6/2852 250/227.3 |
| 4,880,971 A * | 11/1989 | Danisch | ................ | G01F 23/292 250/577 |
| 4,928,006 A * | 5/1990 | Kershaw | ................ | G01D 5/268 250/227.25 |
| 4,933,545 A * | 6/1990 | Saaski | ................ | G01L 11/02 250/231.19 |
| 4,945,230 A * | 7/1990 | Saaski | ................ | G01N 21/7703 374/E11.018 |
| 4,983,824 A * | 1/1991 | Saaski | ................ | G01D 5/266 250/227.27 |
| 5,099,683 A * | 3/1992 | Remboski, Jr. | ........ | F02D 35/022 73/114.72 |
| 5,619,046 A * | 4/1997 | Engstr om | ............ | G01L 9/0079 356/519 |

(Continued)

FOREIGN PATENT DOCUMENTS

| | | |
|---|---|---|
| CN | 206321301 U | 7/2017 |
| CN | 108759983 B | 4/2020 |

OTHER PUBLICATIONS

International Preliminary Report on Patentability for International Patent Application No. PCT/US2023/062305, dated Aug. 6, 2024, 8 pages.

*Primary Examiner* — John Fitzgerald
(74) *Attorney, Agent, or Firm* — Kinney & Lange, P.A.

(57) ABSTRACT

An optical sensor includes an optic fiber optically coupled to a cavity. An optical path is defined from the fiber, across the cavity, and reflected back across the cavity back into the fiber. The cavity is an open cavity that is in fluid communication with an environment ambient to the cavity for detection of changes in index of refraction inside the cavity due to whether the environment ambient to the cavity is gaseous or liquid.

10 Claims, 3 Drawing Sheets

(56) References Cited

U.S. PATENT DOCUMENTS

| | | | |
|---|---|---|---|
| 7,054,011 B2* | 5/2006 | Zhu | G01L 9/0079 356/480 |
| 7,104,141 B2* | 9/2006 | Zerwekh | G01D 5/35312 374/E11.016 |
| 7,710,567 B1 | 5/2010 | Mentzer et al. | |
| 7,728,984 B2* | 6/2010 | Waegli | G01K 11/3206 356/454 |
| 7,940,400 B2* | 5/2011 | Lopushansky | G01L 9/0079 356/519 |
| 9,581,514 B2* | 2/2017 | Pechstedt | G01L 9/0079 |
| 9,677,949 B1* | 6/2017 | Han | G01J 3/45 |
| 9,766,099 B2* | 9/2017 | Pechstedt | G01K 11/3206 |
| 9,766,178 B2* | 9/2017 | Pechstedt | G01F 23/292 |
| 10,053,269 B2 | 8/2018 | Chan | |
| 10,641,673 B2* | 5/2020 | Crowne | H02J 50/30 |
| 10,748,702 B2 | 8/2020 | Cheim | |
| 11,585,712 B2* | 2/2023 | Carini | G01L 11/025 |
| 12,025,482 B2* | 7/2024 | Crowne | G01L 9/0079 |
| 2002/0154305 A1* | 10/2002 | Jung | G01N 21/6486 433/29 |
| 2005/0046862 A1* | 3/2005 | Melnyk | G01J 3/0218 356/480 |
| 2005/0050962 A1* | 3/2005 | Zerwekh | G01D 5/35312 374/E11.016 |
| 2006/0126991 A1 | 6/2006 | Huang | |
| 2007/0013914 A1* | 1/2007 | May | G01L 9/0079 356/480 |
| 2015/0020599 A1* | 1/2015 | Pechstedt | G01L 19/04 73/705 |
| 2015/0033848 A1* | 2/2015 | Pechstedt | G01P 15/08 73/497 |
| 2015/0100253 A1 | 4/2015 | Austerlitz et al. | |
| 2015/0177132 A1* | 6/2015 | Pechstedt | G01N 33/22 356/517 |
| 2015/0378055 A1* | 12/2015 | Godfrey | G02B 1/14 423/625 |
| 2018/0045541 A1* | 2/2018 | Pechstedt | G01L 9/0079 |
| 2018/0052029 A1 | 2/2018 | Carralero et al. | |
| 2019/0049280 A1* | 2/2019 | Carralero | G01F 23/292 |
| 2024/0068893 A1* | 2/2024 | Sun | G01L 19/0092 |

* cited by examiner

OPTICAL FABRY-PEROT BASED LIQUID LEVEL SENSORS

BACKGROUND

1. Field

The present disclosure relates to liquid level sensing, and more particularly to liquid level and quantity sensing such as used in aircraft fuel tanks.

2. Description of Related Art

In fuel and flammable liquid measurement applications it is important to know the quantity of liquid in a storage vessel, both volume and mass. In high integrity fuel gauging systems, such as those used on commercial aircraft, it is also necessary to know fuel level for several discrete points in the tanks, especially wing tanks. Using current electrically based sensors makes installation for intrinsic safety difficult The conventional techniques have been considered satisfactory for their intended purpose. However, there is an ever present need for improved systems and methods for improved liquid and quantity level sensors such as for aircraft fuel tanks. This disclosure provides a solution for this need.

SUMMARY

An optical sensor includes an optic fiber optically coupled to a cavity. An optical path is defined from the fiber, across the cavity, and reflected back across the cavity back into the fiber. The cavity is an open cavity that is in fluid communication with an environment ambient to the cavity for detection of changes in index of refraction inside the cavity due to whether the environment ambient to the cavity is gaseous or liquid.

The fiber can define a longitudinal axis that extends through the cavity. The cavity can be defined between a first optical member and a second optical member spaced apart from the first optical member. The first optical path can pass from the fiber, through the first optical member, through the cavity, reflects off of the second optical member and passes back through the cavity and through the first optical member into the fiber. A standoff can support the second optical member from the first optical member. The standoff can be a first standoff in a plurality of standoffs circumferentially spaced apart around the cavity. A respective opening can be defined between each circumferentially adjacent pair of the standoffs. The opening can provide for fluid communication between the ambient environment and the cavity. The first optical body and standoffs can all include a sapphire material.

The second optical body can be an endplate with a partially mirrored surface for increasing signal reflections through the cavity. The first optical body can be a main sensor body. A second optical path can be defined from the fiber, through the main sensor body to a surface of the main sensor body bounding the cavity, and reflected from the surface of the main sensor body bounding the cavity back through the main sensor body to the fiber without passing into the cavity.

A method of sensing liquid level and/or quantity includes monitoring an optical signal from an optical sensor in a container for a change in refractive index in a cavity of the optical sensor. The method includes determining at least one of liquid level and liquid quantity upon detection of the change in refractive index and based on known location of the optical sensor in the container.

The optical sensor can be one in a plurality of optical sensors. Location of each respective one of the plurality of optical sensors in the container can be known. Determining at least one of liquid level and liquid quantity can include updating at least one of liquid level and liquid quantity each time a change in refractive index is detected for one of the plurality of optical sensors. The method can include using data from the plurality of optical sensors to determine surface angle of a liquid in the container relative to orientation of the container in determining liquid level and or liquid quantity.

Monitoring the optical signal can include using a Fast Fourier Transform (FFT) on data derived from the optical signal to find a peak frequency corresponding to an optical path length (OPL) through the cavity. Detection of the change in refractive index can include detecting a change in frequency of the peak frequency indicative of a change in refractive index in the cavity and thermally induced refractive index changes of the liquid.

The method can include using data returned from the optical sensor indicative of optical length of a sensor base of the optical sensor to determine temperature of the optical sensor. Detection of the change in refractive index can include using the temperature of the optical sensor to compensate for thermal expansion/contraction effects altering optical length of the cavity.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
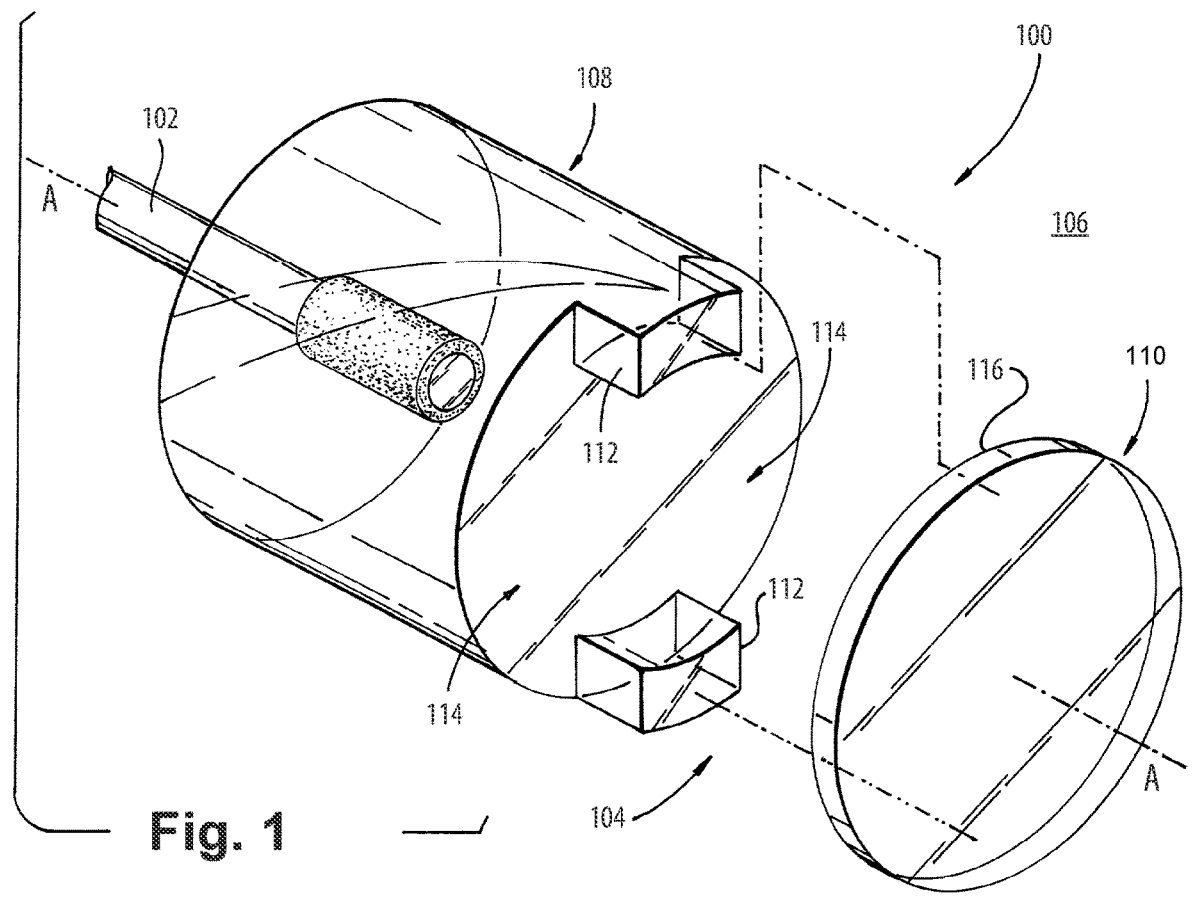
FIG. 1 is a schematic exploded perspective view of an embodiment of an optical sensor constructed in accordance with the present disclosure, showing the standoffs supporting the endplate from the main sensor body across the cavity.

Reference will now be made to the drawings wherein like reference numerals identify similar structural features or aspects of the subject disclosure. For purposes of explanation and illustration, and not limitation, a partial view of an embodiment of an optical sensor in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to help determine liquid level and/or quantity in a container such as an aircraft fuel tank.

The optical sensor 100 includes an optic fiber 102 optically coupled to a cavity 104. The cavity 104 is an open cavity that is in fluid communication with an environment 106 ambient to the cavity 104 for detection of changes in index of refraction inside the cavity 104 due to whether the environment 106 ambient to the cavity is gaseous or liquid. In other words, the liquid or gas of the environment 106 immediately proximate the sensor 100 flows into the cavity 104 and the sensor 100 can detect the index of refraction of that liquid or gas. The fiber 102 defines a longitudinal axis A that extends through the cavity 104. The cavity 104 is defined between a first optical member, which is a main sensor body 108, and a second optical member, which is an endplate 110, spaced apart from the main sensor body 108 in the axial direction of axis A.

A plurality of standoffs 112 support the endplate 110 from the main sensor body 108. The standoffs 112 are circumferentially spaced apart around the cavity 104 relative to the axis A. A respective opening 114 is defined between each circumferentially adjacent pair of the standoffs 112. The openings 114 provide for fluid communication between the ambient environment 106 and the cavity 104. While shown and described with an exemplary number of two standoffs 112 and two openings 114, those skilled in the art will readily appreciate that any suitable number of standoffs 112 and openings 114 can be used, including one each, without departing from the scope of this disclosure.

The main sensor body 108, standoffs 112, and endplate 110 can all include a sapphire material. The endplate 110 can optionally have a partially mirrored surface 116 for increasing signal reflections through the cavity if needed for a given application. The main sensor body 108, standoffs 112, and endplate 110 can be bonded together using the process explained in U.S. Pat. No. 10,294,525 to Sentek Instruments, LLC, which is incorporated by reference herein in its entirety, to form a single assembly, with the endplate 110 parallel to the main sensor body 108. An advantageous construction technique is to machine a circular cavity for the desired depth of for the cavity 104 in the axial direction between the main sensor body 108 and the endplate 110, and then to machine away material to construct the base of the main optical body 108 and the standoffs 112. The endplate 110 can then be bonded to the standoffs 112 using the Sapphire-to-Sapphire direct bonding technique disclosed in U.S. Pat. No. 10,495,525 referenced above.

Figure 2:
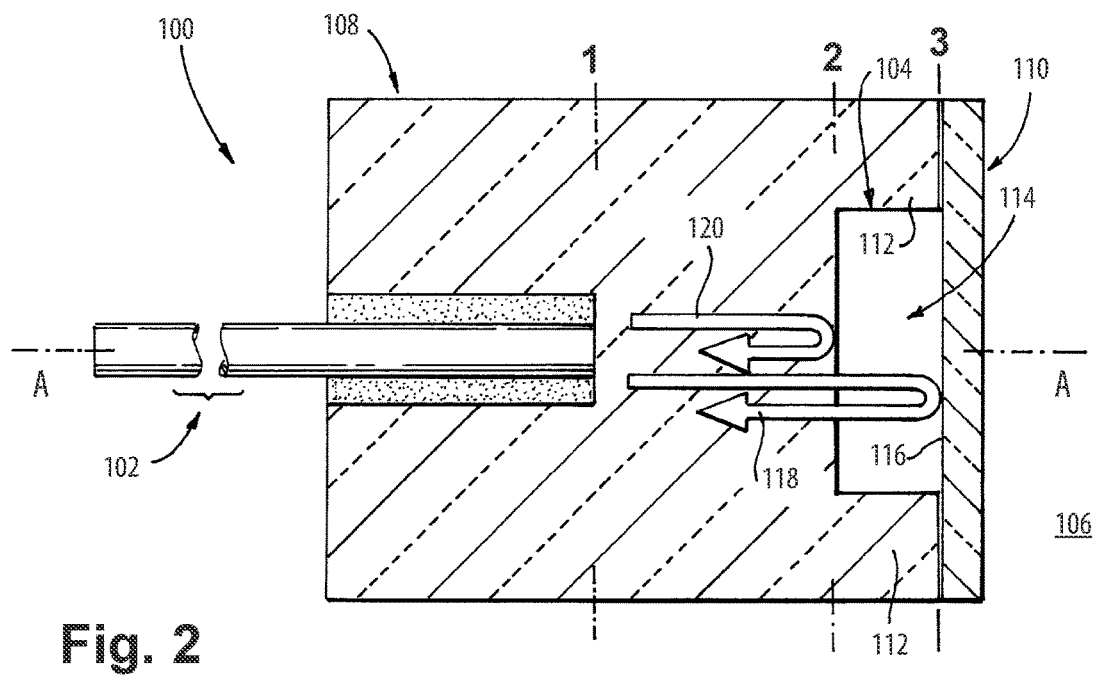
FIG. 2 is a schematic cross-sectional side elevation view of the optical sensor of FIG. 1, showing two optical paths for use in determining temperature of the sensor and refractive index of a fluid in the cavity.

With reference now to FIG. 2, first optical path 118 is defined from the fiber 102, through the interface 1 between the fiber 102 and the main sensor body 108, through the main sensor body 108, through the interface 2 between the main sensor body 108 and the cavity 104, across the cavity 104. The first optical path 118 is reflected at the interface 3 between the cavity and the endplate 110, back across the cavity 104, through the main sensor body 108, and back into the fiber 102. The optical signal return from the first optical path 118, or its optical path length (OPL), can be analyzed as discussed below to determine the index of refraction of a fluid in the cavity 104.

Figure 4:
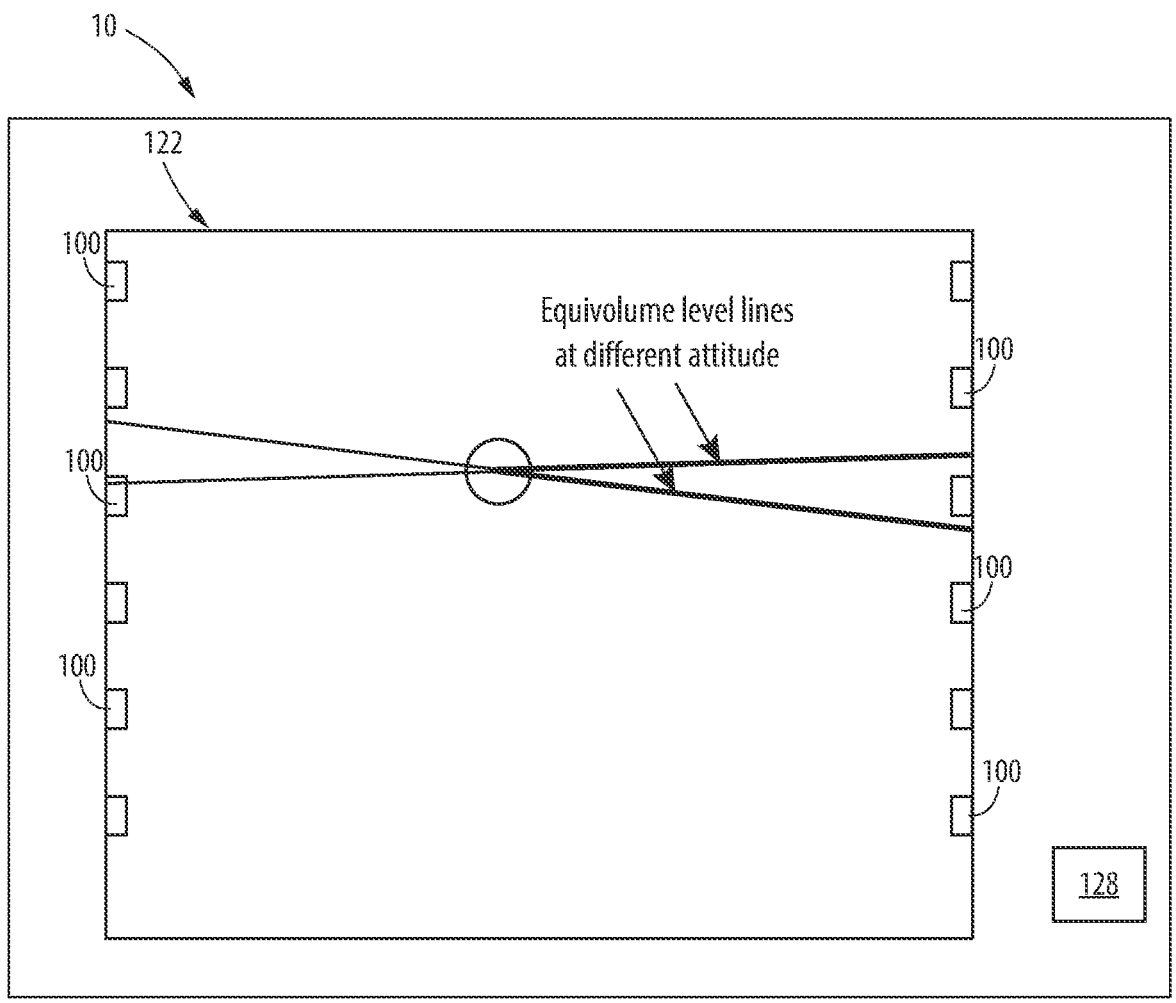
FIG. 4 is a schematic side-elevation view of a container with sensors such as that shown in FIG. 1, showing how a plurality of the sensors can cooperate for determining liquid level and/or quantity even when the orientation of the container is not always the same.

A second optical path 120 is defined from the fiber 102, through the interface 1, through the main sensor body 108 to a surface of the main sensor body 108 bounding the cavity 104 (at interface 2), and is reflected back from that surface (at interface 2) back through the main sensor body 108 to the fiber 102 without passing into the cavity 104. This optical return single through the fiber from this second optical path 120 can be used in determining the temperature of the sensor 100 as discussed below. As shown in FIG. 4, a plurality of sensors 100 can be mounted at known positions within a container 122 for use in determining the liquid level within the container 122.

The distance for the optical path difference (OPD) between interfaces 2 and 3 is a key design parameter for a given application of the sensor 100. It can be important that this gap, i.e. the length of the gap 104 in the direction of axis A, be designed such that it never overlaps the OPD for the main sensor base 108, i.e. so that the distance between interfaces 2 and 3 does not overlap with the distance between interfaces 1 and 2. The OPD between interfaces 2 and 3 should also be large enough to shed fuel or water while also returning sufficient signal amplitude for detection. For longer distances across the gap 104, in other words if a given application requires a longer axial length of the gap 104, a collimating lens at the fiber end may be used. In this case, it is important to choose materials and lengths such that additional OPD's are reduced/minimized or are out of the range of interest.

Figure 3:
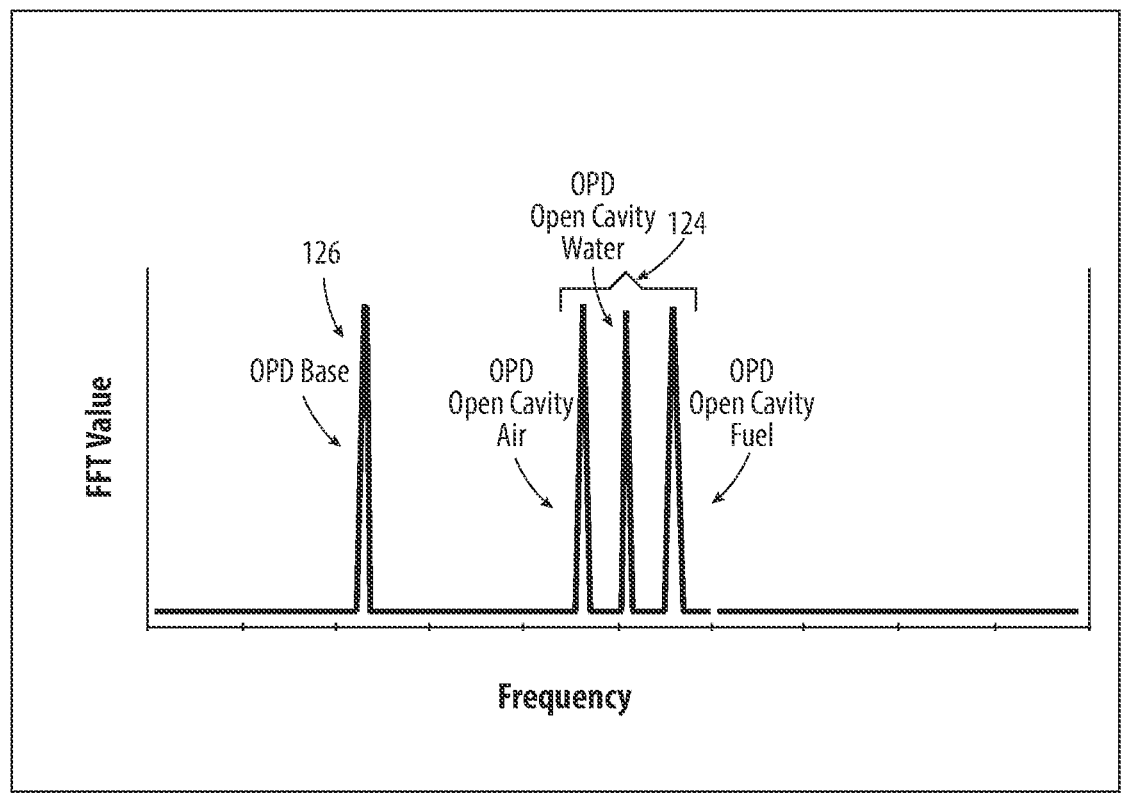
FIG. 3 is a frequency domain graph showing peak optical signal return frequencies for various fluids in the cavity of the sensor of FIG. 1.

With reference to FIGS. 3-4, a method of sensing liquid level and/or quantity in a container, e.g. container 122 such as an aircraft's fuel tank, includes monitoring an optical signal returning from an optical sensor, e.g. sensor 100, in a container. The optical data is converted to a signal indicative of frequencies.

The detection scheme is to measure wavelengths in the returned spectrum from the fiber 102. This will return includes a pattern of interference fringes spread across the wavelength range of the optical source. Conventionally, finding the interference fringes is done with a spectrometer. It is then possible to use the relationship $C=\lambda/f$ to determine frequency, where C is the wave speed (e.g. of light), $\lambda$ is the wavelength identified in the spectrometer, and f is the frequency. The frequency data undergoes a fast Fourier transform (FFT) to identify peaks located along the frequency axis in the frequency domain in FIG. 3. Typically, two peaks 124, 126 will manifest. First, a peak 124 is indicative of resonant wavelength of the first optical path 118 of FIG. 2. Depending on the position of the first peak 124, it can be determined whether the index of refraction is indicative of air (or more generally any gas), water, fuel, or more generally any other liquid, as indicated by the three different peaks 124 labeled in FIG. 3, within the cavity 104 labeled in FIGS. 1-2. This peak 124 corresponds to an optical path difference (OPD) measured for the first optical path 118 identified in FIG. 2.

With continued reference to FIG. 3, using data returned from the optical sensor 100 indicative of optical length (OPL or OPD) of the sensor base 108 (identified in FIGS. 1-2) of the optical sensor allows for determination of temperature of the optical sensor. After using the FFT on wavelength domain data from the second optical path 120 labeled in FIG. 2, the exact frequency value of the second peak 126 in FIG. 4, indicative of a resonant wavelength of the second optical path 120, can be used to determine the OPL/OPD of the second optical path 120. This can provide a precise length measurement of the second optical path 120, which is dependent upon thermal expansion/contraction state of the optical sensor 100. Given a known thermal expansion coefficient and length of the second optical path 120, one can derive the temperature of the sensor 100 based on the frequency of the peak 126. Detection of the change in refractive index can includes then be corrected for temperature using the temperature of the optical sensor 100 to compensate for thermal expansion/contraction effects altering optical length of the cavity 104, because the length of the standoffs 110 is altered by changes in temperature.

With continued reference to FIG. 4, the method includes determining at least one of liquid level and liquid quantity in the container 122 based upon detection of the change in refractive index for the sensors 100 and based on known locations of the optical sensors in the container 122. When a given sensor 100 detects a change from liquid to gas in its cavity 104, that is an indicator that the liquid level has dropped below that sensor 100. Given the location or depth of the sensor 100 in container 122 when the sensor 100 has a change in index of refraction, calculations can be made to determine the liquid level in the container 100. The greater the number of sensors 100 distributed in the container 100, the greater the resolution can be of measurements of the liquid level/quantity in the container. If the sensors 100 are distributed not only in the depth direction, but also across the span of the container 122, then corrections can be made for the angle of the surface of the liquid relative to the orientation of the container 122, e.g. to correct for attitude of an aircraft or other vehicle in the case of fuel level/quantity measurements. Two different liquid surface angles are shown in FIG. 4. Those skilled in the art will readily appreciate that a three-dimensional distribution of sensors 100 throughout a three-dimensional container 122 will allow for three dimensional liquid surface determination for correction/accuracy of liquid level/quantity measurements. It is also possible to determine the relative attitude of the liquid surface and the container 122 using angle sensors, e.g. outside the container, to determine the angle of the container relative to the direction of gravity and/or any other body forces acting on the liquid, such as forces from acceleration as the container 122 moves. A controller 128 can be operatively connected to the network of sensors 100 for making the measurements described above. For sake of clarity in the drawings, the connections between individual sensors 100 and the controller 128 are not depicted in FIG. 4.

Systems and methods as disclosed above can provide potential advantages over traditional systems such as the following potential advantages. Since optical sensors as disclosed herein can use extremely low power and since the interrogation signal is optical, they are intrinsically safe by nature, e.g. for use in fuel tanks. This makes sensors as disclosed herein much easier for an airframe manufacturer to install, since electrical clearance rules for fuel tanks do not apply. Temperature and liquid level can be measured independently within the same sensor.

The methods and systems of the present disclosure, as described above and shown in the drawings, provide for determining liquid level and/or quantity in a container such as an aircraft fuel tank. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An optical sensor comprising:
   a fiber optically configured to receive an optical signal from an optical source;
   a main sensor body having a known coefficient of thermal expansion, the main sensor body aligned to receive the optical signal from the fiber via a first interface and configured to reflect the optical signal from a second interface, thereby creating a peak in the reflected optical signal, the peak corresponding to a resonant wavelength corresponding to an optical path between the first and second interfaces is indicative of temperature of the main sensor body;
   a plurality of standoffs projecting from the second interface and circumferentially spaced apart around an optical axis; and
   an endplate supported by the plurality of standoffs thereby forming a cavity between the second interface of the main sensor body and the endplate, the cavity in fluid communication with an environment external to the cavity via openings defined between adjacent pairs of the plurality of standoffs,
   wherein a resonant wavelength of the cavity is indicative of whether the cavity is filled with gas or liquid.

2. The sensor as recited in claim 1, wherein the endplate includes a partially mirrored surface for reflecting the optical signal through the cavity.

3. The sensor as recited in claim 1, wherein the main sensor body forms a first Fabry Perot interferometer between the first interface and a second interface along an optical axis, the first Fabry Perot interferometer configured to return a first optical signal with a first resonant frequency indicative of temperature.

4. The sensor as recited in claim 1, wherein the cavity is further configured to operate as a second Fabry Perot interferometer that is configured to return a second optical signal with a resonant frequency indicative of whether the cavity is filled with gas or liquid.

5. The optical sensor as recited in claim 1, wherein the main sensor body and the plurality of standoffs are formed of a same material.

6. The optical sensor as recited in claim 5, wherein the main sensor body and the plurality of standoffs are machined from a block of the same material.

7. The optical sensor as recited in claim 5, wherein the main sensor body and the plurality of standoffs form a unitary body.

8. The optical sensor as recited in claim 5, wherein the main sensor body and the plurality of standoffs all include a sapphire material.

9. The optical sensor as recited in claim 5, wherein the endplate is formed of the same material.

10. The optical sensor as recited in claim 9, wherein the main sensor body, the plurality of standoffs and the endplate all include a sapphire material.

* * * * *